3,241,348
METHOD AND APPARATUS FOR FORMING
SHEET MEMBERS
Ralph E. Roper, Indianapolis, Ind., assignor to Wallace Expanding Machines, Inc., Indianapolis, Ind., a corporation of Indiana
Filed Aug. 5, 1963, Ser. No. 299,960
10 Claims. (Cl. 72—324)

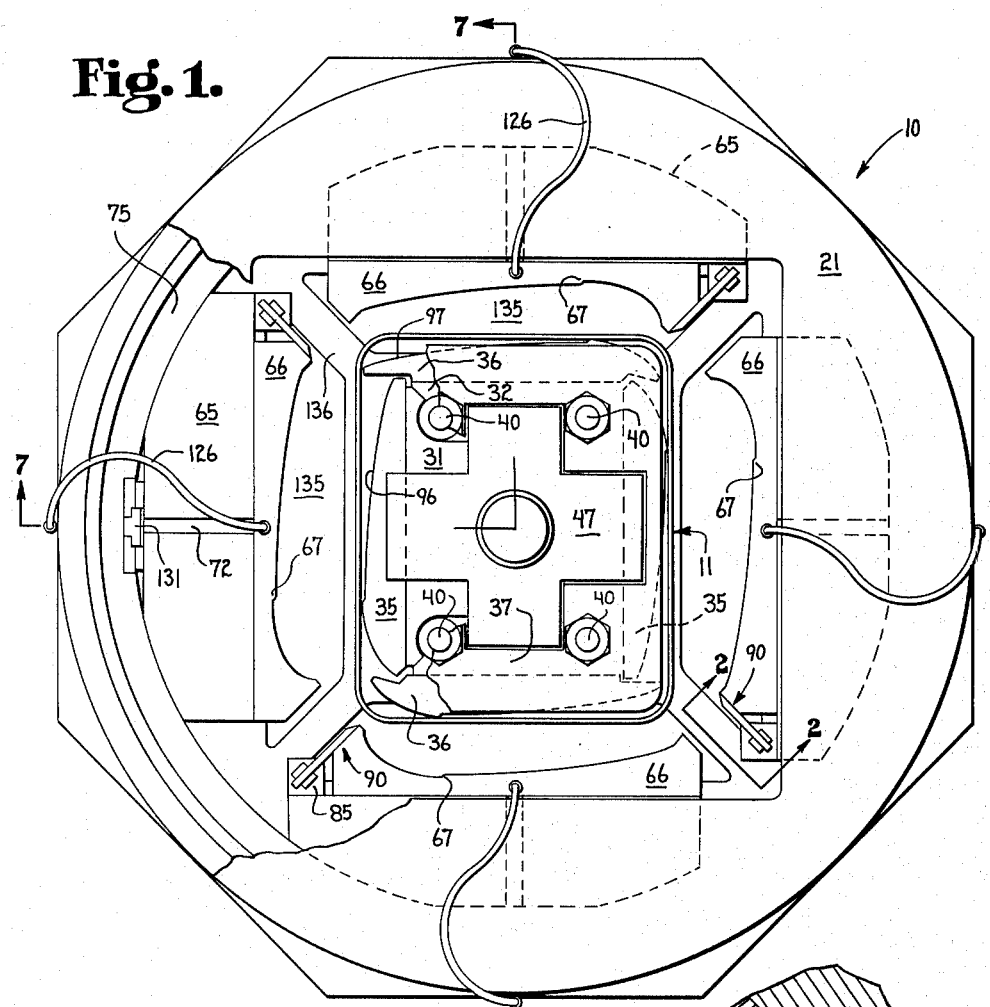
Fig. 1.
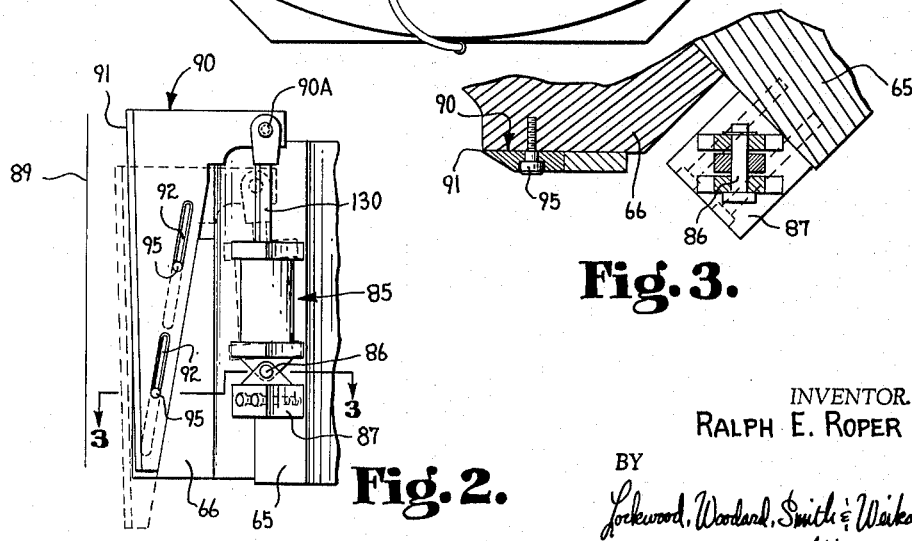
Fig. 2.
Fig. 3.
INVENTOR.
RALPH E. ROPER
BY
Lockwood, Woodard, Smith & Weikart
Attorneys INVENTOR.
RALPH E. ROPER
BY Lockwood, Woodard, Smith & Weikart
Attorneys March 22, 1966     R. E. ROPER     3,241,348
METHOD AND APPARATUS FOR FORMING SHEET MEMBERS
Filed Aug. 5, 1963     3 Sheets-Sheet 3
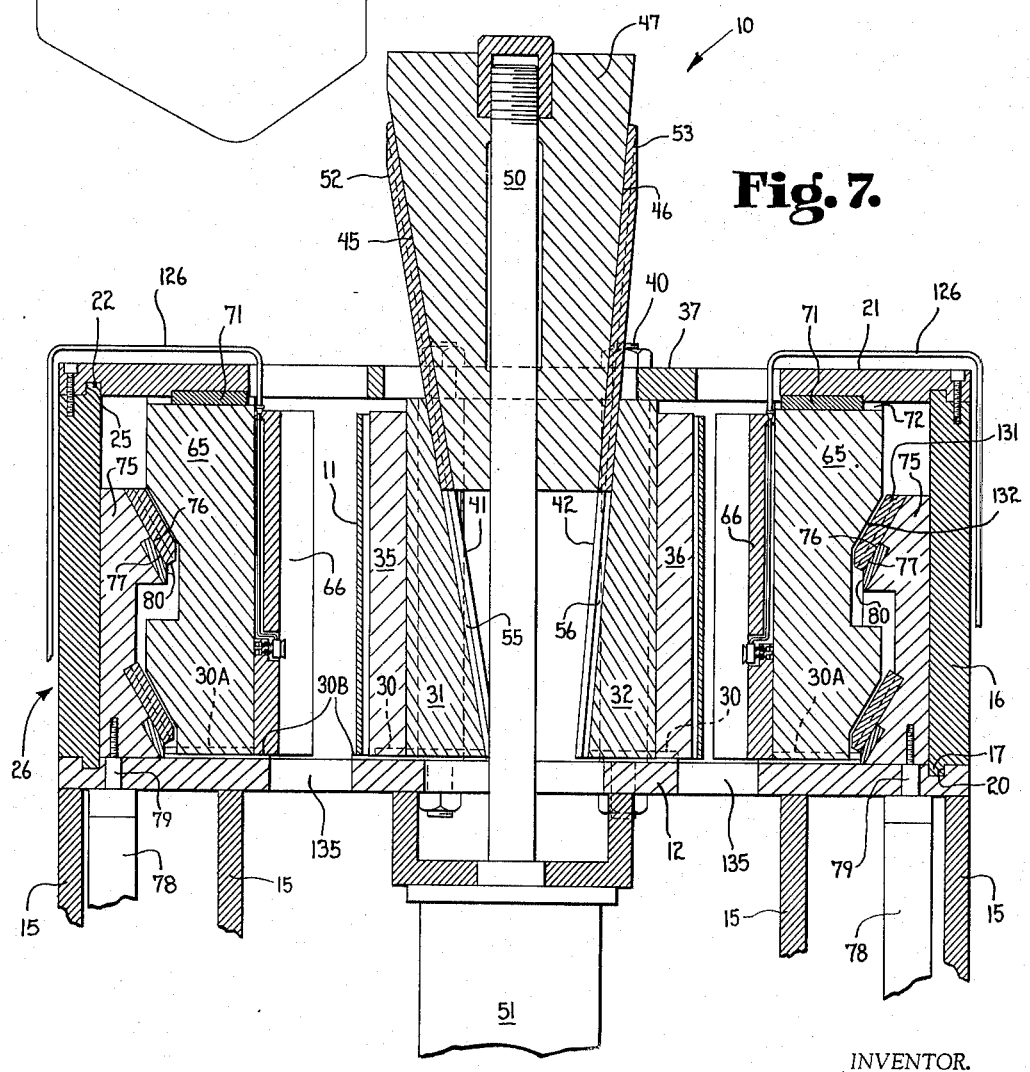
INVENTOR.
RALPH E. ROPER United States Patent Office 3,241,348
Patented Mar. 22, 1966

The present invention relates to method and apparatus for forming metallic sheet into parts such as automobile fenders, doors, bonnets and other drawn sheet metal parts.

One object of the present invention is to provide improved method and apparatus for forming metallic sheet into parts.

As disclosed in detail in my copending application S.N. 175,152 entitled, Method and Apparatus for Forming Metallic Sheet Members, filed February 23, 1962, it is particularly desirable to form sheet metal parts such as automobile doors by expanding a tubular sheet steel member. The result of such an expanding process may be a plurality of the desired parts connected together by scrap metal. It is necessary to separate the various parts by cutting through the scrap metal before the final finished parts can be produced. A primary object of the present invention is to provide an improved method and apparatus for forming sheet metal parts quickly and efficiently with a relatively minor amount of moving of the work piece from place to place.

Further objects and advantages will become apparent as the description proceeds.

One embodiment of the method of the present invention comprises forming sheet metal parts by expanding and stretching a closed tubular sheet member over a die structure having a discontinuous forming face wherein each continuous portion of the forming face defines one complete surface of a respective one of said parts, and cutting the metal between the thus formed parts while the parts are supported on the dies.

One embodiment of the apparatus of the present invention comprises a plurality of dies each having an outwardly facing surface having the shape desired for one complete surface of a respective one of said parts, means for moving said dies outwardly to stretch an annular member thereover and form the parts, and means for separating the thus formed parts while supported on said dies.

The full nature of the invention will be understood from the accompanying drawings and the following description and claims.

FIG. 1 is a top plan view with portions broken away of apparatus embodying the present invention.

FIG. 2 is a vertical section taken along the line 2—2 of FIG. 1 in the direction of the arrows.

FIG. 3 is an enlarged horizontal section taken along the line 3—3 of FIG. 2 in the direction of the arrows.

FIG. 7 is a vertical section taken along the line 7—7 of FIG. 1 in the direction of the arrows.

FIG. 8 is a perspective view of a closed sheet metal member preformed for reception within the expander of FIG. 1.

Figure 4:
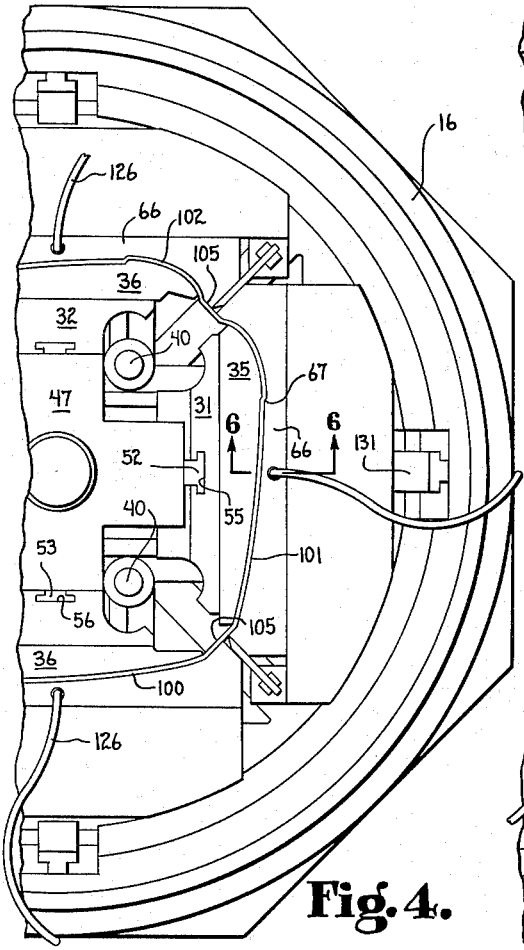
FIG. 4 is a view similar to FIG. 1 but showing the apparatus in a different operating position.

Referring more particularly to the drawings, there is illustrated in detail in FIGS. 1–7 an expander apparatus 10 which operates upon the rectangular shaped closed sheet metal structure 11 shown in FIG. 8 to expand it into a cluster of connected sheet metal parts and to separate the parts. The expander 10 includes a base 12 which is supported upon vertically extending members 15 and has fixed thereto a cylindrical or ring-shaped member 16. In order to firmly fix the ring-shaped member to the base, the member 16 is provided with a downwardly projecting annular lip 17 which is received within a suitable annular recess 20 in the base. An annular top plate 21 is fixed to the upper edge of the ring-shaped member 16 in similar fashion with the lip 22 in recess 25 whereby a rigid cylindrical housing 26 is provided.

A plurality of radially extending keys 30 are fixed to and received within suitable radially extending apertures in the base 12. The keys 30 provide trackways for four tool or die carrier members 31 and 32. Fixed to the outer surfaces of the carriers 31 and 32 are scab dies 35 and 36 which can be removed and replaced by different shaped dies if desired and depending upon the type of part being formed. The die and die carriers 31, 32, 35 and 36 are movable between the base 12 and a center cluster top plate 37 which is fixed in spaced relation to the base 12 by means of the shouldered bolts 40, the top plate 37 acting to retain the die carriers upon the trackforming keys 30.

Each of the die carriers 31 and 32 has a tapered inner surface 41 and 42 against which the tapered outer surfaces 45 and 46 of an inner driver member 47 act. The driver member 47 is fixed to a vertically extending piston rod 50 of a fluid motor 51 which is fixed to the base 12. When the motor 51 is operated to move the driver 47 downwardly, the surfaces 45 and 46 of the member 47 cam against the inner surfaces 41 and 42 of the die carriers to move them outwardly. When the fluid motor 51 is operated to move the piston rod 50 and driver member 47 upwardly, the die carriers 31 and 32 are drawn inwardly by means of T-shaped keys 52 and 53 fixed to the surfaces 45 and 46 and received within T-shaped slots 55 and 56 formed within the die carriers. For further disclosure of the details of the above structure, reference is made to my above mentioned copending patent application. It can be appreciated that vertical movement of the driver member 47 in opposite directions produces inward and outward movement of the die carriers 31 and 32 and the dies 35 and 36 mounted thereon.

Four outer die carriers 65 are radially slidable upon the trackway providing keys 30A. Preferably, bearings 30B formed of bronze material or the like are provided in the base 12 at its upper surface across which the die carriers 65, 31 and 32 travel. Each of the die carriers 65 has an outer die 66 mounted thereon. The outer dies 66 are provided with inwardly projecting portions 67 which function to form the indentations and recesses in the external surfaces of the cluster of parts being formed in the work piece 11. The annular top plate 21 has fixed in the lower face thereof radially extending keys 71 which project into the upward opening grooves 72 in the upper surface of the outer die carriers 65 and act as additional trackways for the die carriers 65. The outer die carriers are moved inwardly and outwardly by means of cam means 75 which may be in the form of a ring.

The cam ring 75 is provided with tapered inwardly facing cam surfaces 76 which act against cooperating surfaces 77 on the external faces of the outer die carriers 65. A plurality of fluid cylinders 78 are fixed to the base 12 and have their piston rods 79 fixed to the cam ring 75 whereby upward projection of the piston rods causes the cam surfaces 76 to move across the surfaces 77 of the outer die carriers and to move the outer die carriers radially inwardly. When the die carriers 65 are in their innermost position, the vertical surfaces 80 of the cam ring 75 are in engagement with vertical surfaces (not shown) of the outer die carriers. Consequently, further vertical movement and seating of the cam ring 75 against the top plate 21 produces no corresponding radial movement of the die carriers and the die carriers are locked in the position illustrated in FIG. 4 against outward movement. For further disclosure of the above described operation, reference is made to FIG. 5 of the above mentioned application.

Each of the outer die carriers 65 has mounted thereon a fluid piston motor 85. Each piston motor is pivoted at its lower end by pin 86 to a block 87 which is fixed to the outer die carrier. Each outer die 66 has reciprocably mounted thereon a cutter blade 90. Each cutter blade 90 has a cutting edge 91 which is tilted relative to the vertical 89 (FIG. 2) and extends upwardly and inwardly.

Each of the blades 90 is provided with a pair of straight slots 92 through which extend shoulder bolts 95 threadedly secured to the scab dies 66. The slots 92 tilt at an angle and extend inwardly and downwardly. Thus, when the cutter blades 90 are moved downwardly by means of the piston motors 85 pivotally secured thereto at 90A, the cutter blade moves inwardly also to the dotted line position illustrated in FIG. 2.

Each of the forming faces 96 and 97 of the dies 35 and 36 defines the desired shape of the complete inner surface of a respective one of the parts to be formed from the work piece 11. In the illustrated embodiment, four automobile door panels are to be formed from the closed sheet metal work piece 11. Referring to fragmentary FIG. 4, three of these four desired shapes are shown at 100, 101 and 102 and are connected by scrap metal portions 105.

In order to form the cluster of parts shown in FIG. 4, the rectangular work piece 11 is placed about the dies 35 and 36 in the position shown in FIG. 1 with the dies all drawn to their innermost positions by projection of the piston 50 and the driver member 47 to their uppermost position as shown in FIG. 7. The outer cam ring 75 is moved to the inward locked position of FIG. 4 by projection of the piston rods 79 of the cylinders 78. The driver member 47 is then moved downwardly to the position of FIG. 4 causing the dies of 35 and 36 to move outwardly and to stretch the metal of the work piece 11 thereover. Because of the fact that there are no binders or devices gripping any of the metal of the work piece, it is free to flow uniformly and to stretch out not only over the forming faces of the dies 35 and 36 but also at the scrap portions 105 whereby the final transverse dimension taken horizontally across the parts 100, 101, 102 and the further part (not shown) is greater than the complete initial circumference of the work piece 11 as shown in FIG. 8. It should be mentioned that the horizontal cross section of the final formed parts 100, 101 and 102 is not necessarily constant and in most cases (for example, in forming fenders) varies greatly from the top of the parts to the bottom thereof. Thus, the metal flows and stretches not only horizontally but also vertically.

As the dies 35 and 36 move outwardly, they engage the outer dies 66 and cause the projections 67 of the outer dies to force against the work piece 11 and to produce the desired indentations and recesses in the external surface of the parts 100, 101 and 102. The final forming position of the apparatus is shown in FIG. 4. It can be appreciated that until the inner and outer dies are fully engaged, the metal is free to flow and stretch and there are no binders or members gripping the work piece and preventing free flow.

Each of the outer scab dies 66 is provided with a vacuum cup 110. Each vacuum cup 110 is secured to a mounting element 111 which threadedly receives shoulder bolts 112. The shoulder bolts 112 reciprocate within bores 115 and counterbores 116 and 117 all in the outer dies 66. Each of the bolts 112 has a head 120 which is limited in movement by engagement with the shoulder 121. Received about the bolts 112 and acting between the shoulder 122 and the member 111 are springs 125 which normally hold the vacuum cups 110 in a projected position. It can be appreciated, however, that when the outer dies 66 are forming the metal as above described, the springs 125 permit the vacuum cups 110 to be pushed out of the way where they do not interfere with the forming operation. The vacuum cups 110 are each supplied with vacuum through a suitable line 126. The vacuum cups and their associated vacuum providing apparatus are preferably arranged in such a manner that vacuum is always supplied to the vacuum cups and is turned on or off directly at the vacuum cups thus eliminating the necessity, when vacuum is desired at the cups, for vacuum to build up in lines leading to the cups.

After the forming of the work piece has been completed as above described, the various parts 100, 101 and 102 are cut apart by downward movement of the cutting blades 90, said downward movement being produced by actuation of each of the fluid pistons 85. After the cutting operation has been accomplished and the various parts are separated as shown in FIG. 5, the cutter blades 90 are returned to their upward position by projection of the piston rods 130 of each fluid piston 85.

The vacuum for each vacuum cup 110 is then turned on causing the vacuum cups to adhere firmly to the parts 100, 101 and 102. The outer dies are then moved outwardly to the position of FIG. 5 by downward movement of the cam ring 75. The cam ring has mounted thereon a plurality of T-shaped keys 131 which are receivable within T-shaped slots 132 in the external surface of the die carriers 65. As the cam ring moves downwardly, the keys 131 move into the slots 132 and cam against the surfaces of the outer dies causing the outer dies to be moved outwardly away from the inner dies. Because the vacuum cups 110 are each adhered to the respective work pieces and because the vacuum cups are secured to the outer dies by the members 112, the work pieces move with the outer dies to the outer position as shown in FIG. 5. The driver member 47 is raised upwardly by projection of the piston rod 50 causing the die carriers 31 and 32 and the dies 35 and 36 to be moved inwardly and to return to the position illustrated in FIGS. 1 and 7.

Figure 5:
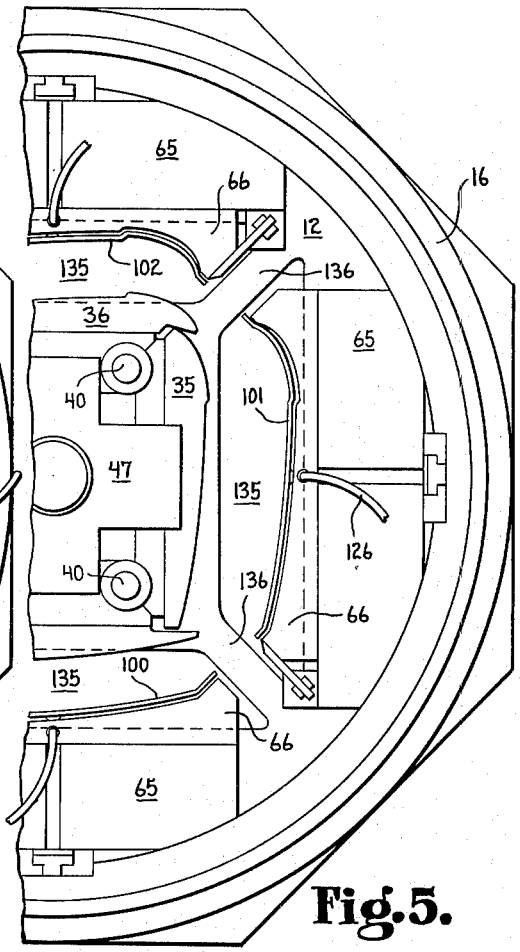
FIG. 5 is a view similar to FIGS. 1 and 4 but showing the apparatus in a still further operating position.
Figure 6:
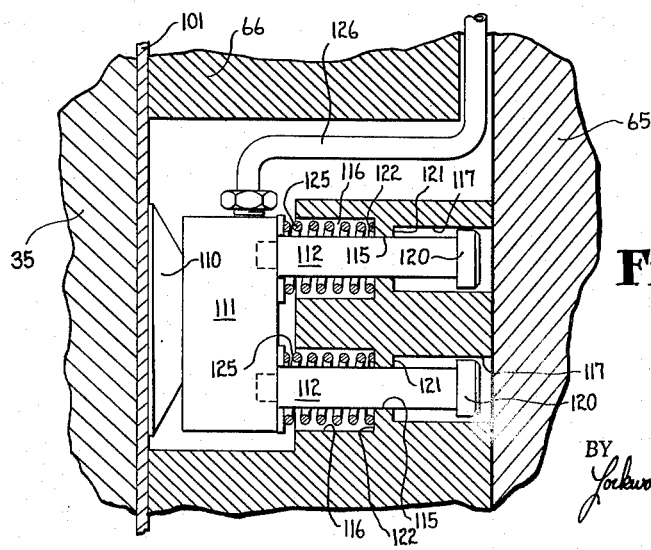
FIG. 6 is an enlarged vertical section taken along the line 6—6 of FIG. 4 in the direction of the arrows.

Referring to FIGS. 5 and 7, there are provided four passages 135 in the base 12. The passages 135 are trapezoidal in shape and are sufficiently large to permit the parts 100, 101 and 102 to pass downwardly therethrough. Referring to FIG. 4, it can be appreciated that the parts 100, 101 and 102, even though cut, are continuous and thus could not pass downwardly through passages in the base 12 without the base 12 being completely cut through to form an annular passage 135 all the way around the base 12. Consequently, the parts 100, 101 and 102 are moved outwardly for dropping through the passages 135. This operation permits a construction of the base 12 with reinforcing webs 136 which provide increased strength and rigidity to the entire forming structure.

After the outer dies 66 have reached the position of FIG. 5, the vacuum in the cups 110 is turned off and the parts are permitted to drop downwardly through the passages 135 onto conveyors carrying the parts to further stations for further operations on the parts.

From the above description, it will be evident that the present invention provides an improved process and apparatus for forming metallic sheet into parts such as automobile fenders, doors, bonnets and other sheet metal parts. It will also be clear that the present invention provides an improved method and apparatus for forming sheet metal parts quickly and efficiently and with relatively minor amount of moving of the work piece from place to place.

While the invention has been disclosed and described in some detail in the drawings and foregoing description, they are to be considered as illustrative and not restrictive in character, as modifications may readily suggest themselves to persons skilled in this art and within the

The invention claimed is:

1. Apparatus for forming sheet metal parts comprising a plurality of dies each having an outwardly facing surface having the shape desired for one complete surface of a respective one of said parts, means for moving said dies outwardly to stretch an annular member thereover and form the parts, and means for separating the thus formed parts while supported on said dies.

2. Apparatus for forming sheet metal parts comprising a plurality of dies each having an outwardly facing surface having the shape desired for one complete surface of a respective one of said parts, means for simultaneously moving said dies outwardly to stretch an annular member thereover and form the parts, a plurality of cutters positioned outwardly of said dies, and means for moving said cutters inwardly between said dies to cut the annular member while stretched over said dies.

3. Apparatus for forming sheet metal parts comprising a plurality of dies slidably mounted for radial movement, means for simultaneously moving said dies outwardly to stretch an annular member thereover and form the parts, a plurality of cutter blades each positioned with the cutting edges of said blades directed inwardly, means for moving each of said blades from an outward position to an inward position spaced vertically of said outward position and wherein said blades extend between said dies for cutting the annular member while stretched over the dies.

4. Apparatus for forming sheet metal parts comprising a base, a plurality of dies slidably mounted on said base for radial horizontal movement, means for causing inward and outward radial movement of said inner dies between an inward position and an outward position, a plurality of cutter blades each positioned with the cutting edges of said blades directed inwardly, a plurality of pairs of shouldered bolts, each pair securing one of said cutter blades relative to said base, each of said cutter blades having slots receiving said bolts, said slots extending downwardly and inwardly whereby downward movement of said blades produces simultaneous inward movement of said blades, means for moving each of said blades between a first outward upward position to a second inward downward position wherein said blades extend between said inner dies when in their outward position.

5. Apparatus for forming sheet metal parts comprising a base, a plurality of inner dies slidably mounted on said base for radial horizontal movement, a plurality of outer dies mounted radially outwardly of said inner dies on said base for radial horizontal movement coaxial to said inner dies, means for causing inward and outward radial movement of said outer dies between a first inward position and a second outward position, said base having passages each of which is positioned below the second outward position of a respective outer die, means for causing inward and outward radial movement of said inner dies between an inward position and an outward position, a plurality of cutter blades each reciprocably mounted upon a respective one of said outer dies and each positioned between a respective pair of outer dies with the cutting edges of said blades directed inwardly, means for moving each of said blades between a first outward position and a second inward position spaced vertically of said first outward position and wherein said blades extend between said inner dies when in their outward position.

6. Apparatus for forming sheet metal parts comprising a base, a plurality of inner dies slidably mounted on said base for radial horizontal movement, a plurality of outer dies mounted radially outwardly of said inner dies on said base for radial horizontal movement coaxial to said inner dies, means for causing inward and outward radial movement of said outer dies between a first inward position and a second outward position, said base having passages each of which is positioned below the second outward position of a respective die, means for causing inward and outward radial movement of said inner dies between an inward position and an outward position, a plurality of cutter blades each mounted upon a respective one of said outer dies and each positioned between a respective pair of outer dies with the cutting edges of said blades directed inwardly, means for moving each of said blades between a first outward upward position to a second inward downward position wherein said blades extend between said inner dies when in their outward position, the cutting edges of said blades extending upwardly and inwardly.

7. Apparatus for forming sheet metal parts comprising a base, a plurality of inner dies slidably mounted on said base for radial horizontal movement, a plurality of outer dies mounted radially outwardly of said inner dies on said base for radial horizontal movement coaxial to said inner dies, means for causing inward and outward radial movement of said outer dies between a first inward position and a second outward position, said base having passages each of which is positioned below the second outward position of a respective outer die, means for causing inward and outward radial movement of said inner dies between an inward position and an outward position, vacuum cups mounted on said outer dies and facing inwardly in generally flush relation with said outer dies, means for providing vacuum to said vacuum cups for attaching to a work piece engaged by said outer die, a plurality of cutter blades each mounted upon a respective one of said outer dies and each positioned between a respective pair of outer dies with the cutting edges of said blades directed inwardly, a plurality of pairs of shouldered bolts each securing one of said cutter blades to a respective outer die, each of said cutter blades having slots receiving said bolts, said slots extending downwardly and inwardly whereby downward movement of said blades produces simultaneous inward movement of said blades, means for moving each of said blades between a first outward upward position to a second inward downward position wherein said blades extend between said inner dies when in their outward position, the cutting edges of said blades extending upwardly and inwardly.

8. Apparatus for forming sheet metal parts comprising a base, a plurality of inner dies slidably mounted on said base for radial horizontal movement, a plurality of outer dies mounted radially outwardly of said inner dies on said base for radial horizontal movement co-axial to said inner dies, a ring fixed to said base and surrounding said outer dies, cam means received and axially movable between said ring and said outer dies and keyed to said outer dies whereby axial movement of said cam means produces inward and outward radial movement of said outer dies between a first inward position and a second outward position, said base having passages each of which is positioned below the second outer position of a respective outer die, means for vertically moving said cam means, a wedge-shaped inner driver received inwardly of said inner dies for coaxial movement with respect thereto, said inner driver being keyed to said inner dies whereby axial movement of said driver produces inward and outward radial movement of said inner dies between an inward position and an outward position, means for producing axial movement of said inner driver, vacuum cups mounted on said outer dies and facing inwardly in generally flush relation with said outer dies, means for providing vacuum to said vacuum cups for attaching to a work piece engaged by said outer die, a plurality of cutter blades each mounted upon a respective one of said outer dies and each positioned between a respective pair of outer dies with the cutting edges of said blades directed inwardly, a plurality of pairs of shouldered bolts each securing one of said cutter blades to a respective outer die, each of said cutter blades having slots receiving said bolts, said slots extending downwardly and inwardly whereby downward movement of said blades produces simultaneous inward movement of said blades, means for moving each of said blades between a first outward upward position to a second inward downward position wherein said blades extend between said inner dies when in their outward position, the cutting edges of said blades extending upwardly and inwardly.

9. A method of forming sheet metal parts comprising expanding and stretching a closed tubular sheet member over a die structure having a discontinuous forming face wherein each continuous portion of the forming face defines one complete surface of a respective one of said parts, and cutting the metal between the thus formed parts while the parts are supported on the dies.

10. A method of forming sheet metal parts comprising moving a plurality of dies against the inside of a closed tubular shape from a retracted position wherein the dies are adjacent one another to an expanded position wherein the dies are spaced from one another whereby first portions of said tubular shape are stretched over said dies and second portions of said shape are stretched at the spaces between said dies, and separating said first portions from one another by cutting through said second portions while said portions are stretched over said dies.

References Cited by the Examiner
UNITED STATES PATENTS

| | | | |
|---|---|---|---|
| 1,966,723 | 7/1934 | Ireland | 113—118 |
| 3,102,502 | 9/1963 | Seeloff | 113—48 |

CHARLES W. LANHAM, *Primary Examiner.*